Figures 1, 2:
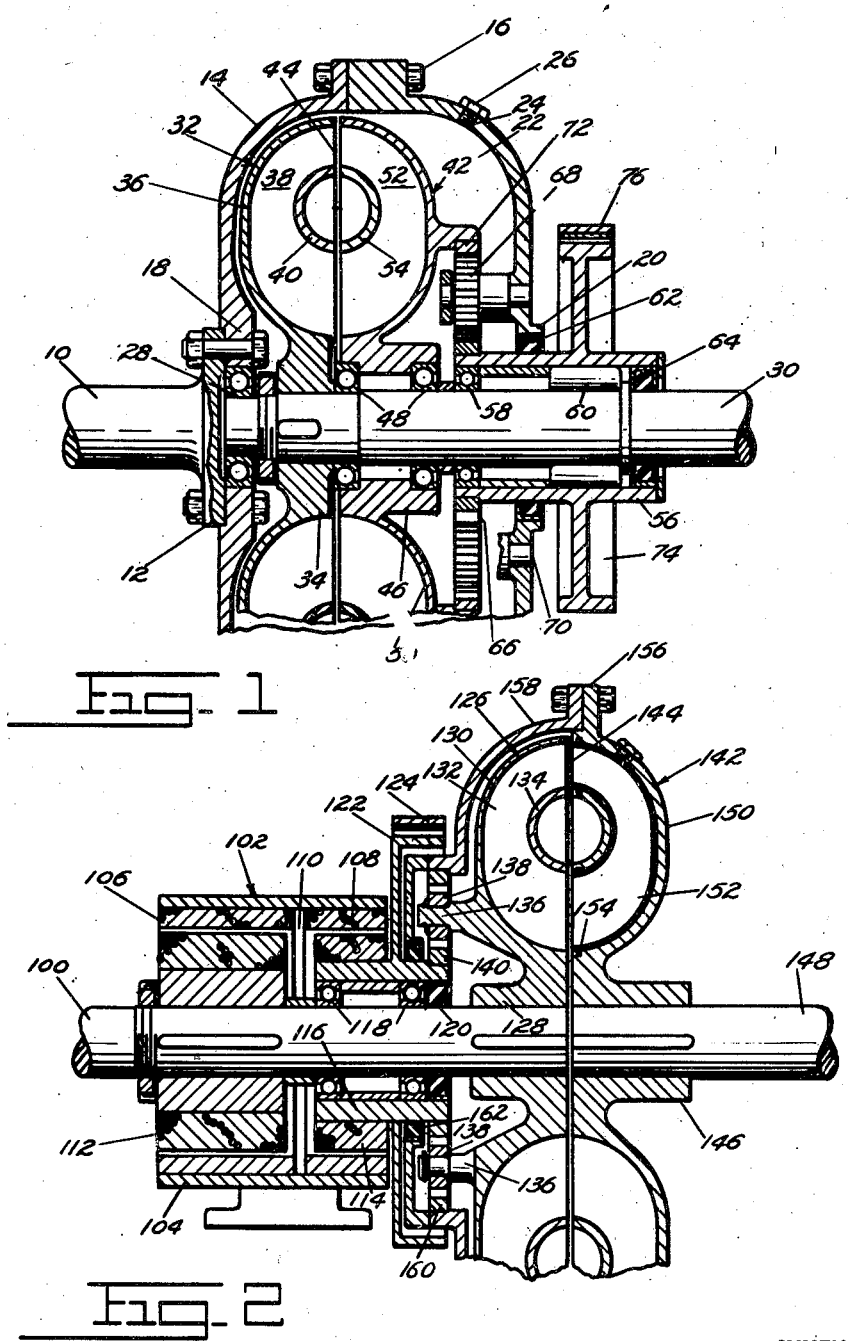

Sept. 30, 1947.   J. JANDASEK   2,428,164
FLUID DRIVE
Filed Aug. 7, 1943

INVENTOR.
JOSEPH JANDASEK
BY
O. H. Fowler
ATTORNEY

Patented Sept. 30, 1947

2,428,164

UNITED STATES PATENT OFFICE 2,428,164

FLUID DRIVE

Joseph Jandasek, Detroit, Mich., assignor to Bendix Aviation Corporation, Detroit, Mich., a corporation of Delaware Application August 7, 1943, Serial No. 497,811

4 Claims. (Cl. 74—189.5)

1

This invention relates to fluid drives.

An object of the invention is to provide a driving shaft and a driven shaft, and coupling means for the shafts providing a plurality of paths for power flow effective to introduce torque multiplication in the coupling.

Another object of the invention is to provide a driving shaft and a driven shaft, and coupling means for the shaft providing a two-path power flow introducing torque multiplication in the coupling, and means operative at will for eliminating one of the paths and effecting overdrive.

Other objects and advantages of the invention will appear from the following description taken in connection with the drawing forming a part of this specification, and in which—

Fig. 1 is a vertical sectional view of a fluid drive embodying the invention; and Fig. 2 is a similar view illustrating a further modification of the invention.

Referring to Fig. 1 of the drawings, 10 represents a driving shaft having a flange 12. A housing 14 having two parts secured together as by bolts 16 has a concentric hub 18 suitably secured to the flange 12 of the driving shaft and a hub 20 oppositely disposed with relation to the hub 18. The housing 14 provides a reservoir 22 having a filling opening 24 normally closed as by a plug 26.

A suitable bearing 28 fitted in the hub 18 of the housing supports for rotation a driven shaft 30 extended through the hub 20 and beyond the wall of the housing; and a turbine indicated generally at 32 includes a hub 34 fixedly secured to the driven shaft 30, and a shroud 36 supported on the hub has secured thereto a plurality of vanes 38 supporting an inner shroud 40.

An impeller indicated generally at 42 is associated with the turbine 32, and provides in conjunction therewith a vortex chamber 44 receiving fluid from the reservoir 22. The impeller includes a hub 46 supported for rotation on suitable spaced bearings 48 mounted on the driven shaft 30. The hub supports a shroud 50 having arranged thereon blades 52 supporting an inner shroud 54, and the shroud 40 has a laterally extended flange.

A sleeve or hub 56 slipped over the driven shaft 30 is supported for rotation on a bearing 58 and a one-way clutch 60, and the sleeve extends through the hub 20 partly within the housing and partly outside of the housing. A fluid seal 62 is interposed between the hub and the sleeve, and another fluid seal 64 is interposed between the sleeve and the driven shaft.

2

These fluid seals inhibit seepage of fluid from the housing. The sleeve 56 has secured thereto within the housing a sun gear 66, and spaced planet pinions 68 mounted on stub shafts 70 carried by the housing mesh with a gear 72 on the shroud 50 of the impeller 42 and with the sun gear 66 on the sleeve 56, and a brake drum 74 on the sleeve 56 has a brake shoe or band 76 associated therewith.

In a normal operation, transmission of force through the driving shaft 10 to the housing 14 results in rotation of the housing and the consequent transmission of force through the planet pinions 68 and sun gear 66 to the sleeve 56, and thence through the one-way clutch 60 to the driven shaft 30. Simultaneously with this operation, force is transmitted from the planet pinions 68 through the ring gear 72 to the impeller, resulting in driving the impeller. This results in energizing the fluid in the vortex chamber 44, and the energy of the fluid so energized is received by the turbine 32, resulting in the transmission of additional force to the driven shaft 30.

When it is desired to effect an overdrive, the brake shoe 76 is applied or set to lock the drum 74 against rotation. This results in holding the sleeve 56 stationary, and under this condition the unit becomes purely a fluid drive, wherein force transmitted from the driving shaft 10 to the housng 14 results in driving the planet pinions 68 in mesh with the sun gear 66, now stationary, and the ring gear 72 on the impeller, resulting in further energizing the fluid in the vortex chamber, and this increased energy of the fluid is received by the turbine 32 and transmitted to the driven shaft 30.

Now, referring to Fig. 2 of the drawing, a driving shaft 100 has mounted thereon an electrical motor and generator indicated generally at 102. As shown, a stator 104, suitably mounted concentrically of the shaft 100 and held against rotation, has thereon two separate windings 106 and 108 connected by a lead 110, the former cooperating with an armature 112 of the motor carried on the driving shaft, and the latter cooperating with an armature 114 of the generator.

The armature 114 of the generator is mounted on a sleeve 116 supported for rotation on suitable spaced bearings 118 fitted on the driving shaft 100, and interposed between the sleeve and the shaft is a sealing member 120. The sleeve has thereon a brake including a drum 122 and a shoe or band 124 for cooperation with the drum.

The driving shaft 100 has suitably secured thereto an impeller indicated generally at 126. As shown, the impeller includes a hub 128 keyed to the driving shaft. The hub has thereon a shroud 130, and arranged on this shroud is a plurality of blades 132 supporting an inner shroud or core 134, and spaced laterally extended stub shafts 136 on the shroud support for rotation planet pinions 138 in mesh with a sun gear 140 on the sleeve 116.

A turbine indicated generally at 142 is associated with the impeller and provides in conjunction therewith a vortex chamber 144 for the circulation of fluid. The turbine includes a hub 146 splined to a driven shaft 148 in axial alignment with the driving shaft. The hub has thereon a shroud 150, and arranged on this shroud is a plurality of vanes 152 pivoted in the wall of the shroud as indicated at 154, and the shroud 150 has a circumferential flange 156 supporting a housing 158 housing the impeller. The housing has suitably secured thereto a ring gear 160 in mesh with the planet pinions 138, and the housing also has a concentric opening for the reception of the sleeve 116, and fitted in this opening is a sealing member 162 for inhibiting seepage of fluid from the vortex chamber.

In a normal operation, transmission of force through the driving shaft 100 to the impeller 126 results in rotation of the impeller. This motion of the impeller energizes the fluid in the vortex chamber 144, and the energy of the fluid is received by the turbine 142 and transmitted to the driven shaft. Simultaneously the impeller 126 drives the planet pinions 138, and these pinions transmit force to the sun gear 140, resulting in energization of the generator and the delivery of current generated thereby to the motor and the transmission of force from the motor to the driving shaft, thence to the impeller, and concomitantly with this operation force is transmitted from the planetary gears 138 through the ring gear 160 and the housing 158 to the turbine 142 connected thereto, and by way of the turbine to the driven shaft.

To effect an overdrive, the brake 124 is applied to hold the armature 114 of the generator 108 against movement. This renders the generator and motor 102 ineffective, and also holds the sun gear 140 against movement. Under this condition, power flows from the driving shaft 100 through the impeller 126 and the planet pinions 138 mounted thereon, to the ring gear 160 on the housing 158, thence through the shroud 150 of the turbine 142 to the driven shaft 148. During this operation the vanes 152 swing on their pivots 154 out of the fluid flow so as to render the fluid coupling ineffective.

While this invention has been described in connection with certain specific embodiments, the principle involved is susceptible of numerous other applications that will readily occur to persons skilled in the art. The invention is, therefore, to be limited only as indicated by the scope of the appended claims.

The instant application is a continuation-in-part of my co-pending application for improvements in Fuid drives, filed May 31, 1941, Serial No. 396,131, now Patent No. 2,339,015.

Having thus described the various features of the invention, what I claim as new and desire to secure by Letters Patent is:

1. A transmission comprising a driving shaft and a driven shaft, a fluid coupling connecting the shafts, an electric motor connected to the driving shaft, a generator for the motor, and a gearing system connected between the coupling and the generator.

2. A transmission comprising a driving shaft and a driven shaft, a fluid coupling connecting the shafts, an electric motor connected to the driving shaft, a generator for the motor and a planetary gear system connecting the fluid coupling to the generator.

3. A transmission comprising a driving shaft and a driven shaft, a fluid coupling connected therebetween, an electric motor having its armature secured to the driving shaft, a generator for the motor having its armature supported for rotation on the driving shaft, a planetary gearing unit connected between the coupling and the armature of the generator, and means for control of the planetary gearing unit.

4. A transmission comprising a driving shaft and a driven shaft, a fluid coupling including driving and driven elements connected therebetween, an electric motor having its armature secured to the driving shaft; a generator associated therewith having its armature mounted for rotation on driving shaft, a planetary gearing unit having a sun gear connected to the armature of the generator, pinions carried by the driving element of the coupling in mesh with the sun gear, and an orbit gear secured to the driven element of the coupling in mesh with the pinions, and a brake for holding the sun gear.

JOSEPH JANDASEK.

REFERENCES CITED

The following references are of record in the file of this patent:

UNITED STATES PATENTS

| Number | Name | Date |
| --- | --- | --- |
| 1,203,265 | Radcliffe | Oct. 31, 1916 |
| 1,711,095 | Klinek | Apr. 30, 1929 |
| 1,900,119 | Lysholm | Mar. 7, 1933 |
| 2,069,360 | Duffield | Feb. 2, 1937 |
| 2,283,759 | Pollard | May 19, 1942 |
| 2,147,528 | Fottinger | Feb. 14, 1939 |
| 2,129,884 | Swan | Sept. 13, 1938 |
| 2,235,370 | Jandasek | Mar. 18, 1941 |
| 2,281,077 | Pollard | Apr. 28, 1942 |
| 2,184,606 | Lavavd | Dec. 26, 1939 |
| 2,212,278 | Sinclair | Aug. 20, 1940 |
| 2,277,214 | Dodge | Mar. 24, 1942 |